United States Patent [19]

Tamaki et al.

[11] Patent Number: 5,070,269
[45] Date of Patent: Dec. 3, 1991

[54] MINIATURE MOTOR HAVING A FREQUENCY GENERATOR

[75] Inventors: Jun Tamaki; Nobuyuki Sata, both of Matsudo, Japan

[73] Assignee: Mabuchi Motor Co., Ltd., Chiba, Japan

[21] Appl. No.: 465,459

[22] Filed: Jan. 16, 1990

[30] Foreign Application Priority Data

Jan. 21, 1989 [JP] Japan .................................. 1-5763[U]

[51] Int. Cl.$^5$ ...................... H02K 19/20; H02K 13/00
[52] U.S. Cl. .............................. 310/171; 310/40 MM; 310/239
[58] Field of Search ................ 310/40 MM, 67 R, 71, 310/89, 168, 169, 170, 171, 238, 239

[56] References Cited

U.S. PATENT DOCUMENTS

| | | | |
|---|---|---|---|
| 3,646,376 | 2/1972 | Anderson | 310/156 |
| 3,739,211 | 6/1973 | Hasler | 310/168 |
| 4,049,984 | 9/1977 | Ishii et al. | 310/168 |
| 4,237,394 | 12/1980 | Aoki | 310/113 |
| 4,501,983 | 2/1985 | Schmider | 310/113 |
| 4,529,900 | 7/1985 | Uzuka | 310/156 |
| 4,827,175 | 5/1989 | Kobayashi | 310/268 |
| 4,875,110 | 10/1989 | Kazama et al. | 310/268 |
| 4,884,000 | 11/1989 | Müller | 310/268 |

FOREIGN PATENT DOCUMENTS

| | | | |
|---|---|---|---|
| 1937068 | 1/1971 | Fed. Rep. of Germany | 310/171 |
| 0091667 | 7/1981 | Japan | 310/168 |
| 0013458 | 1/1985 | Japan | 310/168 |

Primary Examiner—Steven L. Stephan
Assistant Examiner—C. LaBalle
Attorney, Agent, or Firm—McGlew & Tuttle

[57] ABSTRACT

A miniature motor having a frequency generator comprising a miniature motor consisting of a stator equipped with a permanent magnet for forming a magnetic field, and a rotor having windings wound on a rotor core, constructed so as to feed electric current to the rotor windings through a commutator which makes sliding contact with current-feeding brushes held by a brush holder fixedly fitted to a small motor case. A frequency generator is provided consisting of a rotor for detecting revolution, a stator disposed in such a manner as to face the rotor, a permanent magnet for forming a magnetic field between the rotor and the stator, and a frequency-detecting coil generating an induced voltage proportional to the revolution of the rotor. The frequency generator is incorporated in the miniature motor, in which the stator of the frequency generator has a cylindrical portion which comes in contact with the inner circumferential surface of the motor housing and a plurality of stator engaging portions, on the open-end edge of the cylindrical portion, for engaging with the open-end edge of the motor housing. The frequency generator stator is fitted to the motor housing in a state where the frequency generator stator cylindrical portion is press-fitted to the motor housing and the stator engaging portions are fitted to the open-end edge of the motor housing, and the brush holder on the small case is provided on the inner circumferential surface of the stator.

5 Claims, 5 Drawing Sheets

MINIATURE MOTOR HAVING A FREQUENCY GENERATOR

BACKGROUND OF THE INVENTION

This invention relates generally to a miniature motor having a frequency generator for detecting motor revolution to drive the capstan in a small-sized tape recorder, for example, and more particularly to a miniature motor having a frequency generator in which efficiency and accuracy in mounting a frequency generator stator in the motor housing are improved by providing on the stator of the frequency generator a plurality of stator engaging portions for engaging with a motor housing.

DESCRIPTION OF THE PRIOR ART

Heretofore, a miniature motor is publicly known, in which a frequency generator, as illustrated in FIG. 8 (A), comprising a rotor (hereinafter referred to as FG rotor) having a plurality of magnetic-pole teeth, a stator (hereinafter referred to as FG stator) having a plurality of magnetic-pole teeth provided in such a manner as to face the rotor magnetic-pole teeth, a permanent magnet (hereinafter referred to as FG magnet) for forming field between the rotor magnetic-pole teeth and the stator magnetic-pole teeth, a frequency-detecting coil (hereinafter referred to as FG coil) generating an induced voltage proportional to the revolution of the rotor, responding to changes in the magnetic field generated by the permanent magnet is incorporated in a standard d-c motor.

FIG. 8 (A) is a structural diagram of assistance in explaining an example of a miniature motor having a frequency motor of a conventional type, FIG. 8 (B) is a perspective view of assistance in explaining the frequency generator used in the prior art shown in FIG. 8 (A).

In FIG. 8 (A), a brush holder (not shown) made of a synthetic resin is fitted to a small case plate 21, and brushes 22 are held by the brush holder. A rotor core 27-1 of a rotor 27 is fixedly fitted via a commutator 26 to a motor shaft 25 supported by bearings 23 and 24. By feeding electric current to a rotor coil 27-2 wound on the rotor core 27-1, the rotor 27 is caused to rotate in the field formed by a magnet 29 fixedly fitted to the inner circumferential surface of a motor housing (hereinafter referred to as large case) 28.

Numeral 30 in the figure denotes a disc varistor formed in a ring shape for preventing sparks likely to be generated by the brushes 22.

Moreover, the motor shaft 25 is extended in the direction of the bearing 24 (in the right-hand direction in FIG. 8 (A)), and the length of the large case 28 in the direction of the motor shaft is increased corresponding to the extension of the motor shaft 25. A frequency generator 31 is housed in the space thus enlarged. The frequency generator 31 consists of an FG rotor 31-1 and an FG stator 31-2. As shown in FIG. 8 (B), the FG rotor 31-1 is formed in such a manner that multi-pole magnetizing magnets are disposed on the outer periphery thereof. The FG stator 31-2 consists of a comb-teeth-shaped core 31-21 disposed in such a manner as to face the outer circumferential surface of the FG rotor 31-1, and an FG coil 31-22 wound on the comb-teeth-shaped core 31-21.

In the prior art shown in FIG. 8, the FG rotor 31-1 is caused to rotate as the motor is rotated. As the FG rotor 31-1 is rotated, the polarity of the magnetic poles on the FG rotor 31-1 facing the comb teeth of the FG stator 31-2 is repeatedly reversed substantially. This causes the direction of magnetic flux crossing the FG coil 31-22 to change, corresponding to the substantial reversal of the magnetic poles of the FG rotor 31-1, thus generating an induced voltage in the FG rotor 31-22. Since the induced voltage has a frequency proportional to the revolution of the FG rotor 31-1, motor revolution can be detected by measuring the frequency of the induced voltage in the FG coil 31-22.

Although the construction and operation of the prior art shown in FIG. 8 have been described in the foregoing, the prior art shown in FIG. 8 has such a construction that a space for housing the frequency generator 31 is provided by extending the motor shaft 25, and increasing the length of the large case 28 in the direction of the motor shaft corresponding to the extension of the motor shaft 25. That is, a space exclusively used for mounting the frequency generator 31 in the motor is required. This poses an unwanted problem of increasing the size of the motor in the direction of the motor shaft.

To solve the aforementioned problem, the present Applicant proposed "A miniature motor having a frequency generator (Utility Model Application No. 61897-1988)" as shown in FIG. 9. FIG. 9 (A) is a structural diagram of a miniature motor having a frequency generator as proposed in the above Utility Model Application. FIG. 9 (B) is a diagram of assistance in explaining the state where the FG coil in the prior art shown in FIG. 9 (A) is installed. Numeral 41 in the figure denotes an FG rotor, which is made of a ring-shaped soft magnetic material disc having serrations (not shown) on the outer periphery thereof; 42 an FG stator; 43 a brush holder, made of a synthetic resin, and other numerals correspond to those shown in FIG. 8. The FG stator 42 is made of a ring-shaped soft magnetic material disc, and consists of an internal gear-shaped core 42-1 on which serrations (not shown) having the same pitch as that of the serrations on the FG rotor 41 is formed on the inner periphery thereof; a pair of FG magnets 42-2 fixedly fitted to the inner surface of the small case plate 21; and an FG coil 42-3 wound along the inner circumferential surface of the large case 28 and the FG magnet 42-2. The internal gear-shaped core 42-1 is fixedly fitted to the large case 28 using an adhesive in such a manner as to come in close contact with the inner circumferential surface of the large case 28.

The prior art shown in FIG. 9 is proposed to take advantage of the fact that there is an unused space above and below the brushes 22 and the commutator 26 shown in FIG. 8. That is, the motor dimensions are prevented from being increased by disposing the frequency generator in that space, thus making the external dimensions of a miniature motor having a frequency generator the same as those of a miniature motor without a frequency generator. In FIG. 9, the magnetic circuit in the frequency generator comprising the FG rotor 41 and the FG stator 42 is formed by a route consisting of FG magnet 42-2→FG rotor 41→internal gear-shaped core 42-1→large case 28→small case plate 21→FG magnet 42-2. That is, as the FG rotor is caused to rotate by motor rotation, magnetic fluxes change in accordance with the change in magnetic resistance in the gap between the FG rotor 41 and the internal gear-shaped core 42-1 of the FG stator 42. This in turn generates an induced voltage having a frequency corresponding to the change in magnetic flux in the FG coil 42-3. Since the frequency of the induced voltage is proportional to the revolution of the FG rotor 41, motor revolution can be detected by measuring the frequency of the induced voltage in the FG coil 42-3.

The prior art shown in FIG. 9 proposed by the present Applicant to solve the problems associated with the prior art shown in FIG. 8 shas such a construction that the internal gear-shaped core 42-1 of the FG stator 42 is fixedly fitted to the large case 28 using an adhesive after the internal gear-shaped core 42-1 is fitted in such a manner as to come in close contact with the inner circumferential surface of the large case 28. Consequently, this arrangement has the following problems in mass-producing miniature motors.

(1) This arrangement involves an adhesive to bond the large case to the internal gear-shaped core, and bonding jigs and tools to position both, leading to increased material and equipment costs.

(2) It requires adhesive coating operation and drying time after application, resulting in a substantial increase in man-hours.

(3) Fitting the internal gear-shaped core to the inside of the large case makes it difficult to maintain the accuracy of positioning of both, often leading to displacement of the internal gear-shaped core.

(4) When applying an adhesive to the inside of the large case, extreme attention and cumbersome work are required not to contaminate other parts with excess adhesive.

(5) It is necessary to control the amount of adhesive to bond the internal gear-shaped core to the large case, and maintain the bonding jigs and tools for applying an adhesive.

(6) The adhesive may chemically degrade the nearby metals (such as the large case, internal gear-shaped core, etc.)

(7) Once the internal gear-shaped core has been bonded to the large case with an adhesive, it becomes difficult to remove the internal gear-shaped core. This precludes a rotor having a larger diameter than the inside diameter of the FG stator from being incorporated in the large case.

SUMMARY OF THE INVENTION

This invention is intended to overcome the aforementioned problems. To achieve the purpose, this invention contemplates a miniature motor having a frequency generator in a space above and below the brushes and the commutator in which the stator of the frequency generator has a cylindrical portion coming in contact with the inner circumferential surface of the motor housing, and a plurality of stator engaging portions is provided on the open-end edge of the cylindrical portion for engaging with the open-end edge of the motor housing; the frequency generator stator being press-fitted to the motor housing while the stator engaging portions are engaged with the open-end edge of the motor housing; and the brush holder on the small case being fixedly fitted to the open-end edge of the motor housing as the brush holder is press-fitted to the inner circumferential surface of the cylindrical portion of the stator.

DETAILED DESCRIPTION OF THE INVENTION

Figure 1:
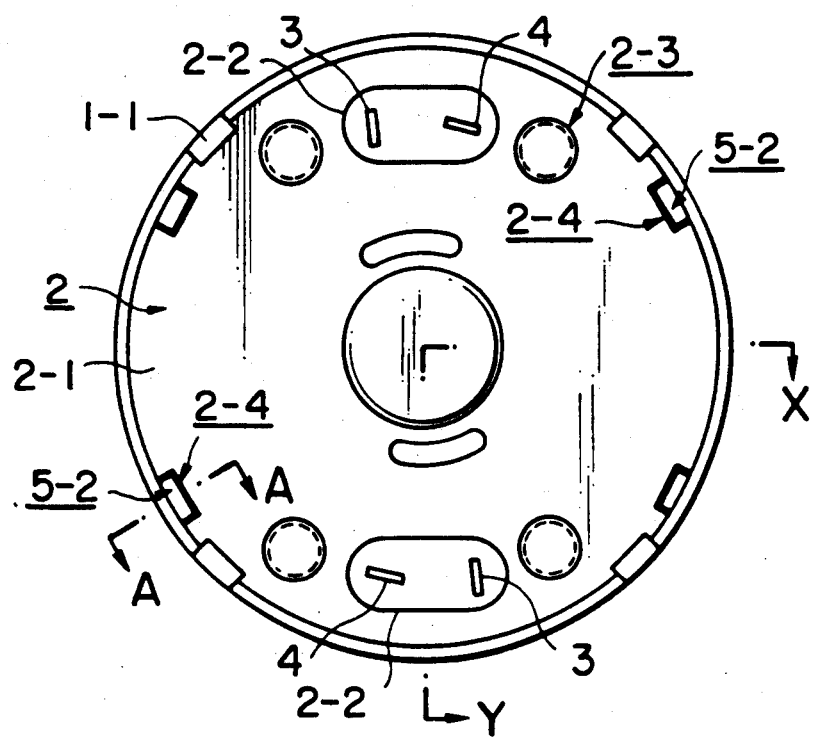
FIG. 1 is a side elevation of an embodiment of this invention, viewed from the side of the small case.

In the figures, reference numeral 1 refers to a large case; 1-1 to a large case staking portion; 1-2 to a large case shouldered portion; 2 to a small case; 2-1 to a small case plate; 2-2 to a brush holder; 2-3 to a brush holder staking portion; 2-4 to a small case notched portion; 3 to a motor terminal; 4 to a frequency generator output terminal (hereinafter referred to as FG terminal); 5 to an FG stator; 5-1 to FG stator magnetic-pole serrations; 5-2 to an FG stator engaging portion; 5-3 to an FG stator notched portion; 6 to an FG rotor; 6-1 to FG rotor magnetic-pole serrations; 7 to an FG coil; 7-1 to a lead wire; 8 to an FG magnet; 9 to a brush; 10 to a disc varistor; 11 to a motor shaft; 12 to a bearing; 13 to a commutator; and 13-1 to a commutator tongue, respectively.

Figure 9A:
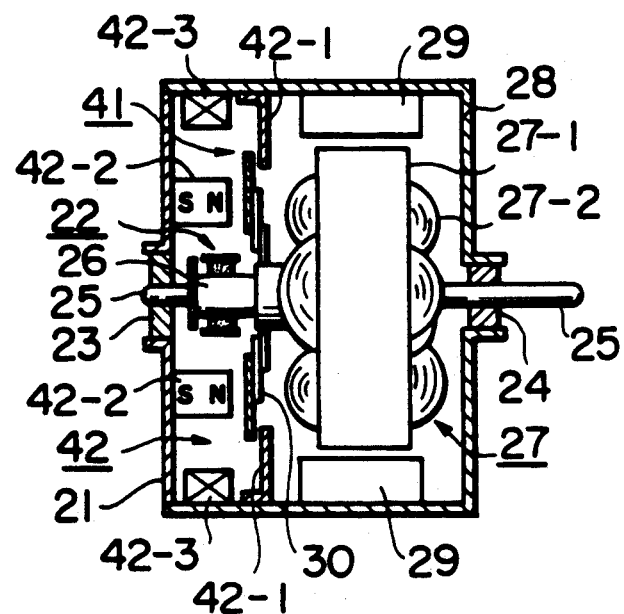
FIGS. 9 (A) and 9 (B) are diagram of assistance in explaining a miniature motor having a frequency generator on which this invention is based.
Figure 9B:
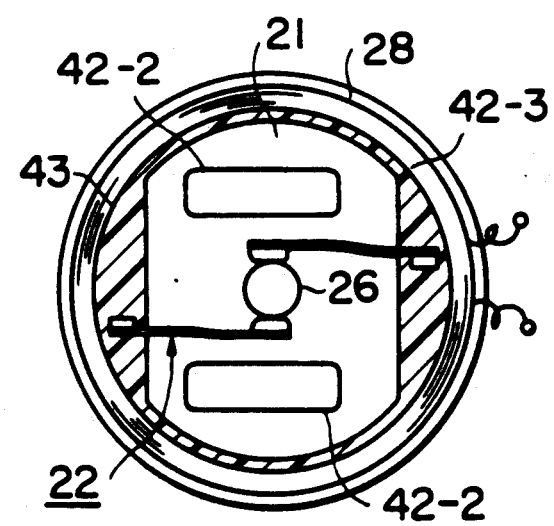

A miniature motor having a frequency generator of this invention is based on the prior art shown in FIG. 9.

Consequently, this invention is basically similar to the prior art shown in FIG. 9, except that a plurality of stator engaging portions for engaging with the large case are provided on the FG stator to improve efficiency and accuracy in installing the FG stator. In the following, the frequency generator and related portions concerned with the FG stator in this invention will be described.

First, the construction of the frequency generator according to this invention will be described, referring to FIGS. 1 through 6, and then those portions relating to the frequency generator, that is, the installing procedures of the FG stator 5 and the small case 2 will be described, referring to FIG. 7.

Figure 2:
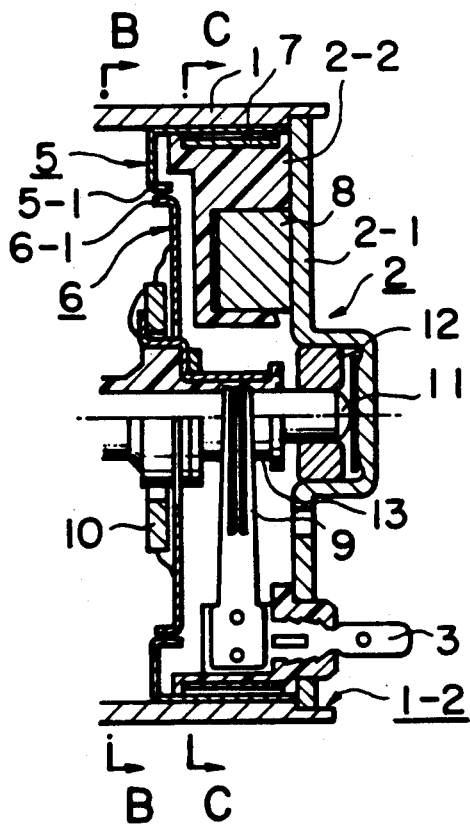
FIG. 2 is a cross section of the essential part of the embodiment of FIG. 1 taken along line X-Y shown in FIG. 1.
Figure 3:
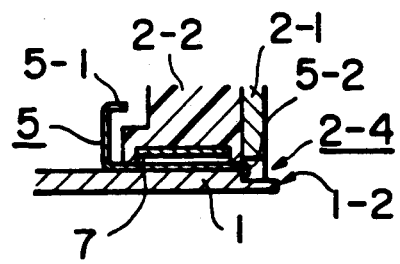
FIG. 3 is a cross section of the essential part of the embodiment of FIG. 1 taken along line A—A shown in FIG. 1.
Figure 4:
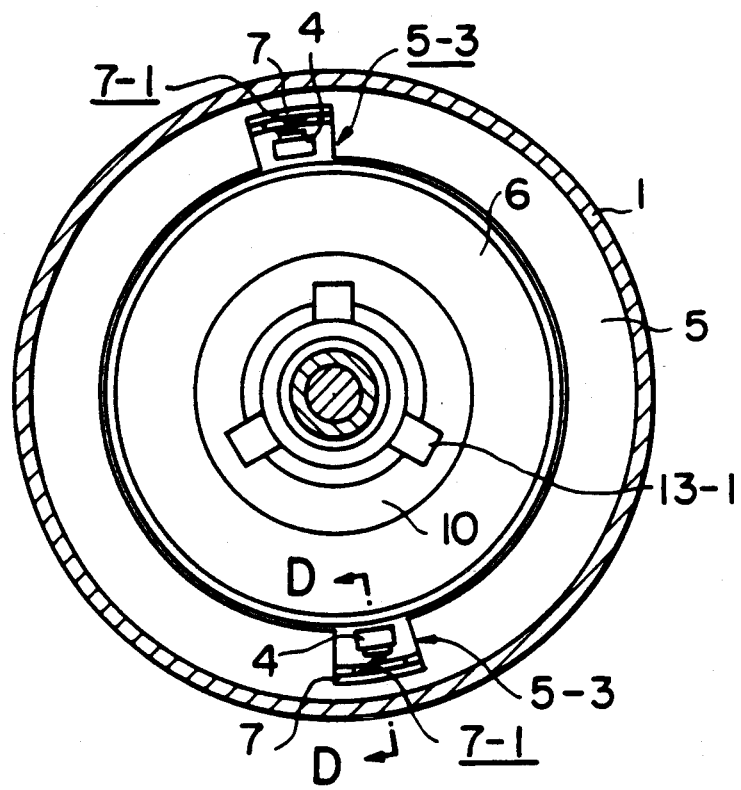
FIG. 4 is a sectional side elevation taken along line B—B shown in FIG. 2.
Figure 5:
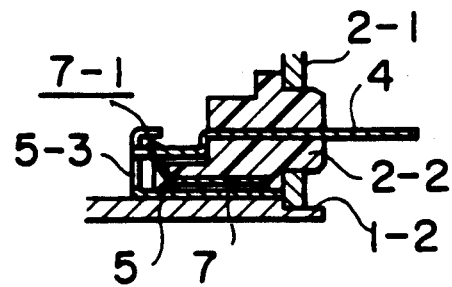
FIG. 5 is a cross section of the essential part of the embodiment of FIG. 1, taken along line D—D shown in FIG. 2.
Figure 6:
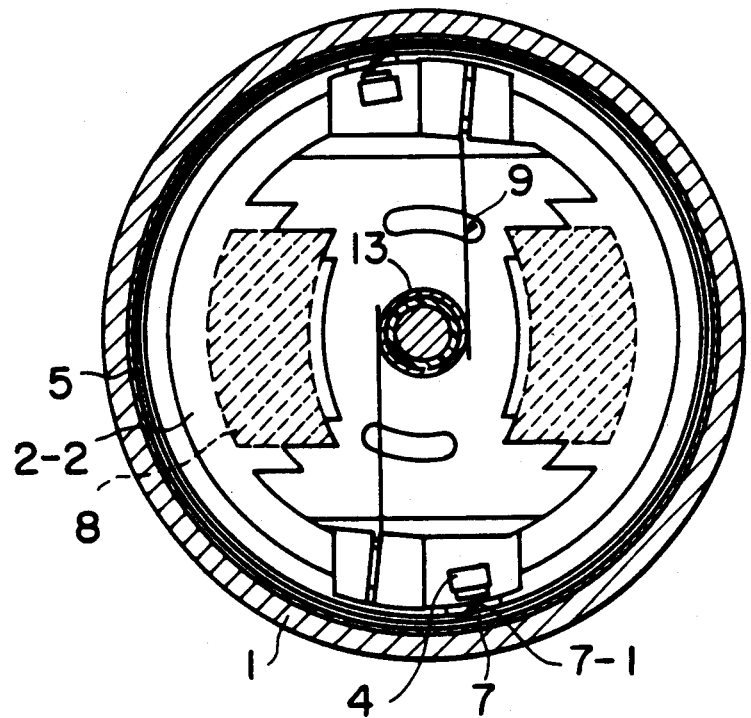
FIG. 6 is a sectional side elevation taken along line C—C shown in FIG. 2.

The FG rotor 6 has FG stator magnetic-pole serrations 5-1 facing FG rotor magnetic-pole serrations 6-1, as shown in FIG. 2, and is press-fitted to the inner circumferential surface of the large case 1. As shown in FIGS. 1 and 3, a plurality (4 pieces in the embodiment shown in FIG. 1) of FG stator engaging portions 5-2 are provided on the open-end edge of the FG stator 5. The FG stator engaging portions 5-2 are adapted to engage with the large case engaging portions 1-2 of the large case 1. Over the entire open-end edge of the FG stator 5 there is provided a flange portion, which may be adapted to engage with the large case shouldered portion 1-2. In general, however, it is difficult to maintain accuracy in machining the large case shouldered portion 1-2 and the small case plate 2-1 to ensure close matching of both, and the construction where the flange portion is sandwiched by the shouldered portion 1-2 and the small case plate 2-1 could deteriorate the perpendicularity of the small case plate 2-1 with respect to the motor shaft 11, adversely affecting alignment between the motor shaft and the bearing 12. In this invention where small case notched portions 2-4 are provided at positions corresponding to the FG stator engaging portions 5-2 on the small case plate 2-1, the small case plate 2-1 can be brought into direct contact with the large case shouldered portion 1-2, with the result that the perpendicularity of the small case plate 2-1 with respect to the motor shaft 11 can be improved. As illustrated in FIGS. 4 and 5, the FG stator 5 has FG stator notched portions 5-3 to avoid interference with the FG terminals 4.

On the small case plate 2-1 fixedly fitted are an FG magnet 8, motor terminals 3, FG terminals 4, and brush holder 2-3, made of a synthetic resin, for holding brushes 9 by means of brush holder staking portions 2-3 (as shown in FIG. 1). An FG coil 7 is wound on the outer periphery of the brush holder 2-2. As illustrated in FIGS. 4 and 5, lead wires 7-1 at both ends of the FG coil 7 are connected to the FG terminals 4 by such a connecting means as soldering.

In the foregoing, the construction of the frequency generator according to this invention has been described.

Next, the procedures for installing the FG stator 5 and the small case 2 will be described specifically, referring to FIG. 7.

Figure 7:
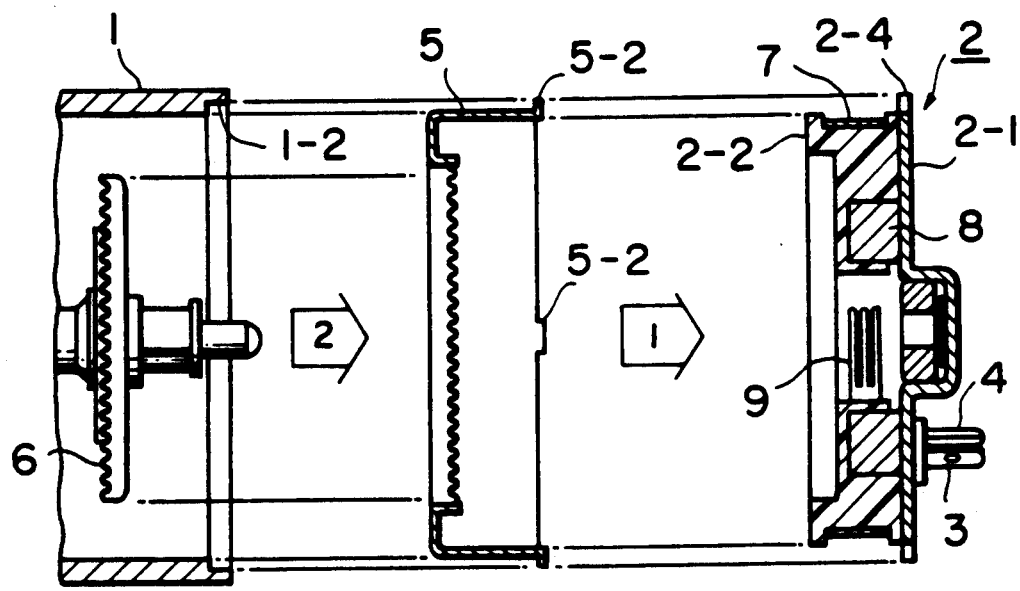
FIG. 7 is a diagram of assistance in explaining the fitting procedure of the FG stator.
Figure 8A:
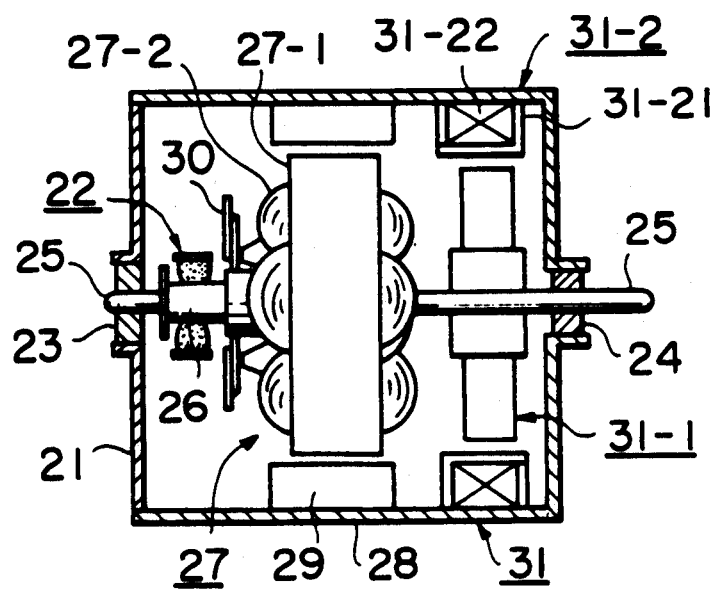
FIGS. 8 (A) and 8 (B) are diagram illustrating the prior art.
Figure 8B:
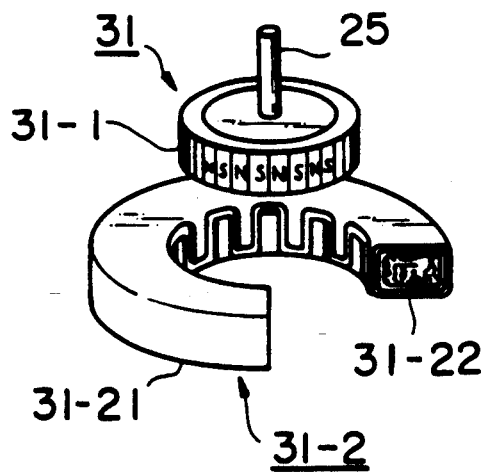

In FIG. 7, (i) the FG stator 5 is press-fitted into the brush holder 2-2 fixedly fitted to the small case 2, as illustrated by arrow 1. In this state, the positions of the FG stator engaging portions 5-2 of the FG stator 5 agree with the positions of the above-mentioned small case notched portions 2-4.

(ii) Next, the small case 2 having the FG stator 5 is press-fitted to the large case 1, as illustrated by an arrow in the figure. In this state, the FG stator engaging portions 5-2 engage with the large case engaging portions 1-2, as noted earlier, causing the small case plate 2-1 to come in direct contact with the large case shouldered portion 1-2. Then, staking is carried out using predetermined press-fitting jigs and tools to ensure the alignment, phase adjustment, etc. of the motor.

(iii) Finally, the small case 2 is tightly secured to the large case 1 by means of four large case staking portions 1-1, for example, as shown in FIG. 1.

By performing the operations (i) through (iii) described above, a miniature motor having a frequency generator of such a construction as described with reference to FIGS. 1 through 6 can be provided.

As described above, this invention makes it possible to provide a miniature motor having a frequency generator in which accuracy in installing the stator of the frequency generator can be improved by providing on the FG stator a plurality of FG stator engaging portions which engage with the large case.

The specific and detailed effects of this invention are as follows.

(1) The FG stator and the small case can be fixedly fitted to the large case, and desired accuracy can be achieved in terms of the concentricity, perpendicularity and parallelism of each component, (2) Use of an adhesive for bonding the internal gear-shaped core to the large case can be eliminated, resulting in reduced material cost.

(3) The assembly of the frequency generator in the miniature motor can be reduced to a standard process, leading to a substantial reduction in manhours.

(4) The interchageability of the FG stator allows a rotor of any desired diameter to be incorporated without regard to the limitation in the inside diameter of the FG stator.

(5) As excess machining operations, such as that for providing positioning means are eliminated, standard large cases can be used.

(6) By combining with FG rotor serrations which are bent in the opposite direction to those of the FG stator, the adverse effects of the spring back of the bent serrations can be reduced.

(7) The fact that small cases equipped with FG stators can be stored helps facilitate the inventory control of secondary parts.

(8) The positioning accuracy of the FG stator in the radial direction can be improved.

What is claimed is:

1. A miniature motor and frequency generator assembly, comprising: a stator equipped with a motor permanent magnet for forming a magnetic field; a rotor including rotor windings wound on a rotor core, said rotor core being mounted on a shaft for rotation; a housing part surrounding said stator and said rotor, said housing part including a housing part open end; a small case supporting part of a frequency generator including a frequency generator permanent magnet and a frequency-detecting coil for receiving changes in magnetic field, said small case also supporting a brush holder with current-feeding brushes; a frequency generator rotor mounted to said rotor on said shaft, said frequency generator rotor being formed of soft magnetic material including a plurality of magnetic pole serations on an outer periphery thereof; a frequency generator stator including a cylindrical portion contacting an inner circumferential surface of said motor housing, said frequency generator stator including a plurality of stator engaging portions, formed on an open end of said cylindrical portion, said plurality of stator engaging portions engaging an open-end edge formed on said motor housing, said frequency generator stator being fitted to said motor housing such that said stator cylindrical portion is press fit to said motor housing and said stator engaging portions engage with said motor housing open-end edge with said stator cylindrical portion surrounding a portion of said small case, said frequency generator stator having an inner periphery with a plurality of magnetic-pole serrations disposed facing said frequency generator rotor magnetic-pole serrations, said frequency-detecting coil being positioned adjacent said frequency generator stator for receiving changes in magnetic field between said frequency generator rotor and said frequency generator stator magnetic-pole serrations and generating an induced voltage proportional to rotor revolution, brush holder being provided on an inner circumferential surface of said stator cylindrical portion; and, a commutator mounted adjacent said rotor for making sliding contact with said current-feeding brushes held by said brush holder, said brush holder being formed in a columnar shape with said frequency detecting coil wound around a columnar portion of said brush holder, said second frequency generator permanent magnet being installed on an inside wall of said small case.

2. A miniature motor having a frequency generator as set forth in claim 1 wherein a shouldered portion is provided on said motor housing open-end edge, and said stator engaging portions engage with said shouldered portion.

3. A miniature motor having a frequency generator as set forth in claim 1 wherein small case notched portions are provided on the outer periphery of said small case, and said frequency generator stator engaging portions and said shouldered portion provided on said motor housing open-end edge engage with each other at positions where said small case notched portions exist.

4. A miniature motor having a frequency generator as set forth in claim 1 wherein said frequency generator stator has notched portion to avoid interference with frequency generator terminals.

5. A miniature motor and frequency generator assembly, comprising:
- a first miniature motor sub-assembly including a cylindrical housing with an open-end edge and with an inner circumferential surface, a motor shaft positioned in said housing, a miniature motor stator including a permanent magnet for forming a magnetic field, said permanent magnet being positioned in said housing, a rotor core mounted on said shaft, a rotor including rotor windings wound on said rotor core, a commutator mounted on said shaft, a frequency generator rotor mounted on said shaft adjacent said rotor, said frequency generator rotor being formed of a soft magnetic material and including a plurality of magnetic-pole serrations provided on an outer periphery of said frequency generator rotor;
- a second sub-assembly consisting of a frequency generator stator formed as a cylindrical portion having an inner periphery with a plurality of magnetic-pole serrations, said cylindrical portion including an open-end edge with stator engaging means for engaging with said open-end edge of said motor housing and an inner cylindrical surface;
- a third miniature motor sub-assembly with a cup-shaped portion for receiving said shaft, said third minature motor sub-assembly including an inner circumferential surface adjacent said cup-shaped portion, a brush holder positioned on said inner circumferential surface for holding current-feeding brushes in contact with said commutator, a frequency generator permanent magnet for forming a magnetic field between said frequency generator rotor magnetic-pole serrations and said frequency generator stator magnetic-pole serrations, said frequency generator permanent magnet being positioned held by said third miniature motor sub-assembly installed on said inner circumferential surface of said third miniature motor sub-assembly, said brush holder being formed in a columnar shape with a column portion, a frequency detecting coil wound on said column portion of said brush holder for generating an induced voltage proportional to rotor revolution, said first, second and third miniature motor sub-assemblies being connected positioned coaxially, with said frequency generator stator cylindrical portion surrounding said third miniature motor sub-assembly and said stator cylindrical portion being press-fit to said motor housing with said stator engaging portions engaging said motor housing open-end edge.

* * * * *